United States Patent
Haller et al.

(10) Patent No.: US 6,836,835 B2
(45) Date of Patent: Dec. 28, 2004

(54) COMBINED LOGIC FUNCTION FOR ADDRESS LIMIT CHECKING

(75) Inventors: Wilhelm E. Haller, Remshalden (DE); Harald Mielich, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 10/172,116

(22) Filed: Jun. 14, 2002

(65) Prior Publication Data

US 2002/0199080 A1 Dec. 26, 2002

(30) Foreign Application Priority Data

Jun. 22, 2001 (EP) .............................................. 01115169

(51) Int. Cl.[7] .............................................. G06F 12/00
(52) U.S. Cl. ..................................... 711/201; 711/220
(58) Field of Search ................................. 711/214, 220, 711/219, 200, 201

(56) References Cited

U.S. PATENT DOCUMENTS

| | | | | |
|---|---|---|---|---|
| 5,577,219 A | * | 11/1996 | Timko et al. ............... | 711/201 |
| 5,652,853 A | * | 7/1997 | Duvalsaint et al. ......... | 711/203 |
| 5,784,713 A | * | 7/1998 | McMahan .................... | 711/220 |
| 5,787,492 A | * | 7/1998 | Shuma et al. ................ | 711/201 |
| 5,961,581 A | * | 10/1999 | Muthusamy ................ | 708/670 |
| 6,209,076 B1 | * | 3/2001 | Blomgren .................... | 711/214 |
| 6,502,177 B1 | * | 12/2002 | Douglas et al. ............. | 711/200 |
| 6,647,484 B1 | * | 11/2003 | Jiang et al. ................. | 711/220 |
| 2002/0194452 A1 | * | 12/2002 | Catherwood ................ | 711/220 |

* cited by examiner

*Primary Examiner*—Matthew Kim
*Assistant Examiner*—Shane Thomas
(74) *Attorney, Agent, or Firm*—Floyd A. Gonzalez

(57) ABSTRACT

The present invention relates to central processing units in computer systems, and in particular, it relates to a method and a respective hardware implementation of an add operation and a subtract operation. A combined add and subtract/compare logic is disclosed comprising: adding a less significant part of two add operands for generating a carry-out bit using a first carry network, adding a respective more significant part of the add operands for bit wise generating sum bits and carry bits, performing a combined subtract operation by bit wise operating a second carry network with respective bits of the more significant part of the subtract operand, and with respective ones of said sum bits, and said carry-out bit of said less significant part add operation, and the carry-out bits of said more significant part add operation. Speed is increased and chip area is saved.

16 Claims, 3 Drawing Sheets

COMBINED LOGIC FUNCTION FOR ADDRESS LIMIT CHECKING

BACKGROUND OF THE INVENTION

The present invention relates to central processing units in computer systems. In particular, it relates to a method and a respective hardware implementation of an add operation and a subtract operation.

Although the present invention has a quite general scope which covers in general method and system for adding and subtracting operands with improved performance and area-optimized implementations it will be next discussed in relation to a specific field of use, namely that of address limit checking. In this particular situation an address A must be checked if it lies within a given zone of the main memory of a computer.

This typical situation is depicted in FIG. 1. Address A is obtained in prior art by adding the base 20 and an offset 22 and comparing the add result, both, with the zone start address 24a and the zone end-address 24b. If address A is within the zone i defined by said start-and end-addresses 24a and b the operation of a program may, for example, be regularly continued and otherwise some prior art exception handling may occur.

Such kind of address limit check operations are often occurred in modern computer systems because the main memory storage size is increased more and more which opens up a variety of operational features, as, for example, to operate on the same central processing unit a first operating system in a first zone and a second operating system in a second memory zone, and loading the respective application programs for being run simultaneously. In such situations most of memory addresses which are issued by any of the executing units must be checked in the above mentioned sense in order to make sure that the application programs may run properly.

In FIG. 1 the memory is partitioned into several zones, indexed by i which is each limited by a start-address and end-address. Thus, multiple zones may be present.

Each zone can begin at a certain 'higher level' boundary, e.g. 1 Mbyte boundary, and can be expanded up to, e.g., 2 GByte, see FIG. 1. All accesses to a certain zone have then to be checked to stay within the zone. Thus, the more frequent such accesses are the more urgently logic functions are required to efficiently check if address A is greater than zone start (ZS) 24a and if it is smaller than zone end (ZE) 24b. As the address A is generated by adding an offset value to a base register value the complete logical function is a 2-operand add operation followed by an adequate compare operation with the zone boundaries. Said compare operation is usually done by subtracting the zone boundary from the add result. This is a very timing critical path within a computer system as the clock cycle is normally adjusted to a 2-operand addition within the ALU. Thus, in prior art this is done sequentially in time.

Some details concerning said prior art approach are next introduced with reference to FIGS. 2 and 3. For the following discussion and disclosure it is assumed without any restriction that the addresses have a width of 64 bits.

Base address 20 and Offset address 22 (FIG. 1) are byte addresses of 64 bit length, whereas the zone start ZS and zone end ZE usually point to boundaries of e.g. 64 KByte, or even to higher level boundaries as e.g., 1 or 2 Gbyte as mentioned before. The relevant parts of the ZE, ZS addresses are therefore by 16 bits (in case of 64 kByte boundary) shorter. This is illustrated in FIG. 2 where the not relevant part 25 of the zone boundary beyond bit 47 is shown filled with '0' digits (zeros).

In prior art, the above mentioned limit check function was done as it is schematically depicted in FIG. 3, by first adding base and offset with a 2-port adder 30, and second, by performing a greater or smaller compare of bit 0 to bit 47 from the adder result with the value of ZS and ZE, respectively. Therefore, two further, separate logic circuits 32, 34 are used in prior art which begin to work after the add result is present on the output of the 2-port adder 30.

As a person skilled in the art may appreciate two major disadvantages result therefrom:

There is a remarkable performance loss because the compare circuit 32 or 34 have to wait until the add result is present from circuit 30, and The area consumption required for implementing the compare circuits 32 and 34 is quite large in regard of the quite similar tasks both circuits have to do. Indeed, they are similar in nature because both compare circuits 32, 34 work according to the same principle, i.e. subtracting an operand from another one.

SUMMARY OF THE INVENTION

It is thus an object of the present invention to provide a method and system for an improved add and subtract operation.

According to the broadest aspect of the invention a method is provided for performing an add operation with two add operands, and a subtract operation with a third operand, of which a less significant part (25) of its binary (1/0) representation exclusively consists of zeros (0), and the subtract operation involves the result of said add operation. It is characterized by the steps of:

a. preferably using a 2-port adder for adding a less significant part of the add operands the bit length of which corresponds to the respective more significant part of said third operand, for generating a carry-out bit using a first carry network, b. in a first step of a 3-port operation concurrently to the above step a) adding a respective more significant part 51 53 of the add operands for bit wise generating sum bits and carry bits preferably in a full adder stage, c. in a second step of the 3-port operation performing said subtract operation by bit wise operating a second carry network
 with respective bits of the more significant part 55 of said third operand,
 with respective ones of said sum bits 56,
 with said carry out bit 54 of said less significant part add operation, and
 with the carry-out bits 58 of said more significant part add operation.

Thus, a general approach is disclosed which applications include mathematical add/subtract operations, amongst the address operations which are actually focused by the disclosed concepts.

By the disclosed combination of said add and compare operations a solution is disclosed which is faster than prior art because of the early start of the 3-port subtract operation which can be done before the add operation is completed. Moreover, the 3-port operation and the 2-port add operation is basically started in parallel which accelerates operation.

Further, the timing of the carry-out of the 2-port operation can be adjusted to be active when needed in 3 port operation part:

The carry-out of carrynet 1 takes longer than the fulladder stage of the 3-port operation. Considering FIG. 6, the carry-out of carrynet 1 seems to be needed directly after the sum and carry bits of the 3 port stage are available. Actually, the control bit takes the position of the carry-in. The carry-out of carrynet 1 can then be faced in at the latest possible point of the 2. part of the 3 port operation, FIG. 4. Thus, a lot of parallel work can be done while the carry-out is generated.

Further, when said first and said second operands are base, and offset address operands, and said third operand is a zone start or zone end address of a storage means, and in particular of a physical memory means, which is divided into one or more of said zones, and the disclosed method further comprises the step of evaluating the carry-out of the second carry network for checking if the address given by said add result of add operands is within the address zone defined by said zone start and zone end addresses, then, the particular preferential use of the disclosed method is found, i.e., address arithmetic, and in particular address limit checking is enabled with the third operand being a higher level boundary in memory, e.g., a Megabyte boundary having 20 least significant bits as trailing or leading (architecture-dependent) zeros, respectively. In those cases an efficient address limit checking is provided by the present invention.

When further a control bit is used for distinguishing between a 'smaller than or equal to', or a 'greater than or equal to', (or the respective complementary conditions) compare operation, respectively, then the same implementation can be used for checking both boundaries of a given memory zone, just controlled via said bit which is integrated into the carry part of the second carry network.

Thus, a hardware logic circuit means for performing the above mentioned disclosed steps may be constructed and used exploiting the advantages cited in here.

Preferably, said control bit is located in the least significant bit position of the location storing the carry bits in the second carry network. This location is usually empty and can thus advantageously be used.

Further, about 30% cell count saving is offered with this approach, and a speed increase of nearly 10% over the cited prior art is achieved.

As a person skilled in the art may appreciate the present invention replaces the sequential steps of prior art by applying more operation parallelism. Thus, a combined logic function for adding and subtracting is provided. This is basically a three-operand operation in which two operands are added and the third one is subtracted during the add. The third operand is basically assumed to be shorter than the two add operands which compose the virtual address, and thus having a certain number of trailing or (leading) '0' (zeros) in its least significant part in order to take profit of all advantages of the disclosed concepts. Otherwise—the third operand having the same size as the other ones—at least the advantage is maintained to save chip area because the combined logic function is smaller than a respective one in prior art.

Thus, the main advantages are that the time is decreased to achieve the result and the amount of circuits needed for the hardware logic implementation is reduced, which reduces chip area consumption. A preferred embodiment of the invention provides one circuit which takes over the task of checking the lower boundary ZS as well as the upper boundary ZE.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
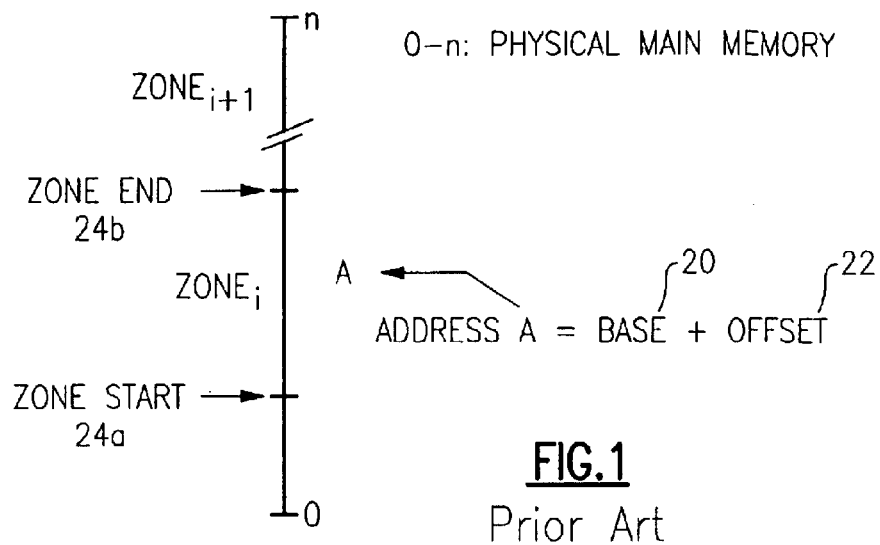
FIG. 1 is a schematic representation illustrating the necessity of address limit checking (prior art)
Figure 2:
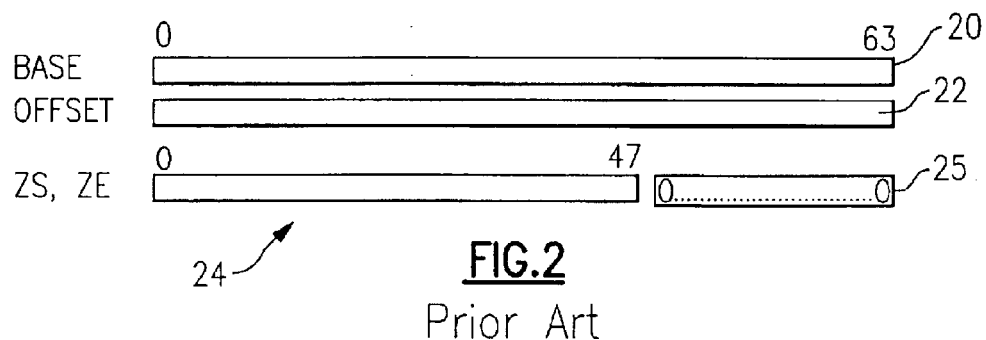
FIG. 2 is a schematic representation showing the basic operands involved in address limit checking (prior art)
Figure 3:
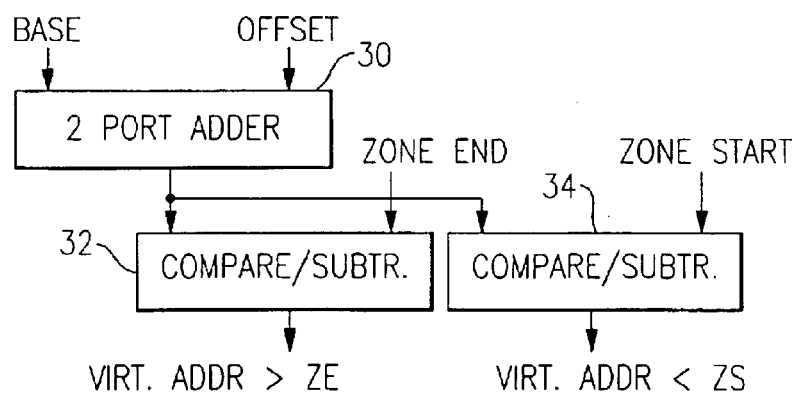
FIG. 3 is a schematic representation of the logic circuits used in prior art for address limit checking.
Figure 4:
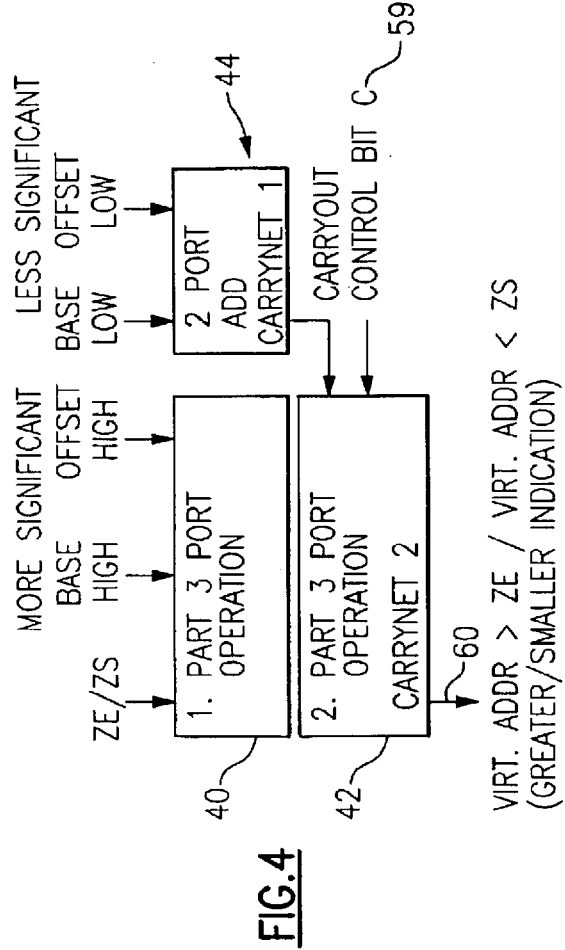
FIG. 4 is a schematic representation according to FIG. 3 and illustrating the combined logic function for adding and comparing according to the invention.

With general reference to the figures and with special reference now to FIG. 4 a preferred hardware logic implementation is implemented in a combined form and comprises a 3-port-operation portion with a first part 40 and a second part 42, as well as a 2-port-adder 44.

This preferred embodiment is able to cover both of the above mentioned checks, i.e., if the virtual address A is greater than the zone-end, as well as the check if address A is smaller than zone-start.

The control bit 'personalizes' the given schematic for 'greater than' or 'smaller than' checks. The control bit indication is a pin 59 which is set by an external signal.

Figure 5:
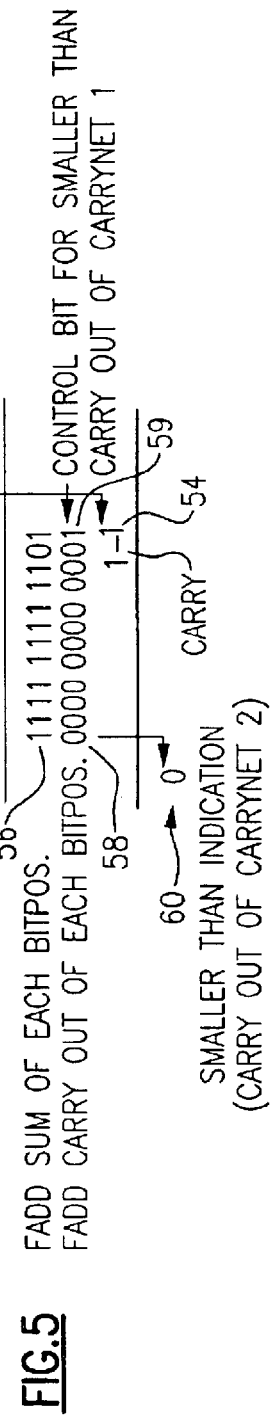
FIG. 5 is a schematic representation which shows an exemplary use of the combined, disclosed circuit depicted in FIG. 4 for a "smaller than zone start" compare.

With additional reference to FIG. 5 the 2-port-adder 44 takes two inputs: a respective less significant part 50, 52 of the add operands 20, 22 the bit length of which corresponds to the respective more significant part of the third operand. Thus, for example, when 20 trailing bits in the third operand's least significant part are present, as the zone boundary is a Megabyte boundary, then said less significant base and offset parts have the same bit length of 20 bits.

The carry network comprised of said 2-port-adder 44 generates a carry out 54. For the actual purpose of most cases the sum of the 2-port-adder is not of interest and can be omitted.

The 3-port operation done by parts 40 and 42 is composed of two steps:

First, a full adder stage in part 40 produces for each bit position a sum bit and a carry bit into the next higher bit position. Advantageously, the lowest bit position of the 3-port operation part is used to fit-in the control bit 59.

Figure 6:
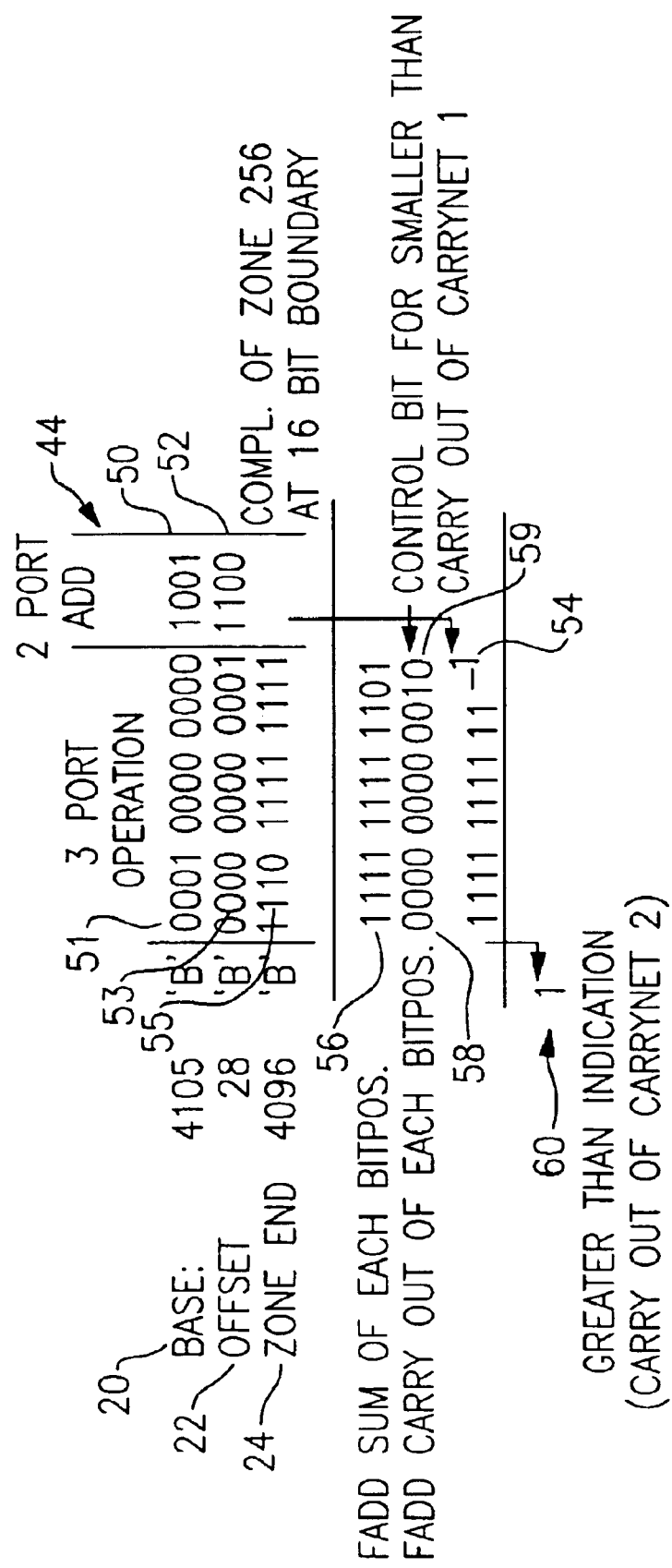
FIG. 6 is a representation according to FIG. 5 for a "greater than zone end" compare.

Second, a carry network denoted as carry net 2 in FIG. 4 is fed by the full adder sum 56 of each bit position, by the carry out 58 of each bit position of the full adder stage, the control bit 59, and the carry out 54 of the 2-port adder part 44. According to the invention the carry-out 60 of the second carry network in part 42 indicates the condition reflecting the compare result according to the rules mentioned down below, both for a control bit 59 value of '0' and '1'. This is further described with the help of FIGS. 5 and 6.

The 'greater than' and 'smaller than' indication of control bit 59 follows the rule:

Control bit=0: 'greater than' indication=0 means that the address A is smaller than or equal to (<=) the zone limit address;

'greater than' indication=1 means that the address A is greater (>) than the zone limit address.

Control bit=1: 'smaller than' indication=0 means that A is smaller than (<) the zone limit address;

'smaller than' indication=1 means that A is greater than or equal to (>=) the zone limit address.

A check is performed with a result of 'true' for the following cases:

With control bit=0 and 'greater than' indication=1, A is larger than the zone end address, With control bit=1 and 'smaller than' indication =0, A is smaller than the zone start address.

Thus, 'true' means in this rule implementation that A is out of the allowed address range.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

It should be noted that the inventive principle is not restricted to be applied in 64-bit architecture. Any other address length is suited as well.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. Method for address limit checking in a system having a target address, the target address comprising (n+1) significant bits formed by adding a binary representation of a base address operand to a binary representation of an offset address operand, wherein an address limit boundary is indicated by a binary representation of an address limit operand, the method comprising the steps of:

adding in a first adder (for adding three binary fields), a high portion (bits 0–n) of the binary representation of the base address operand, a high portion (bits 0–n) of the binary representation of the offset address operand and a 1's complement of the binary representation (bits 0–n) of the address limit boundary operand to produce a first sum, the first adder comprising a full adder for each bit position (bits 0–n), the first sum comprising a sum bit for each bit position (bits 0–n) and a first carry bit for each bit position (bits 0–n);

concurrently with the adding in the first adder step, adding in a second adder (for adding two binary fields), a binary representation of a low portion (bits (n+1)–(m)) of the base address operand and a binary representation of a low portion (bits (n+1)–(m)) of the offset address operand to produce a second carry bit, the second carry bit indicating a carry out of a high order bit (n+1) of the binary representation of the low portions (bits (n+1)–(m));

checking the target address against the address limit operand;

when checking for the target address being greater than the address limit operand, indicating a first address limit error when an arithmetic addition of the sum bits, the first carry bits and the second carry bit produces a carry out value of one "1" of the high order bit (0).

2. The method according to claim 1 comprising the further step of:

when checking for the target address being greater than or equal to the address limit operand, indicating a first address limit error when an arithmetic addition of a value of one "1", the sum bits, the first carry bits and the second carry bit produces a carry out value of one "1" of the high order bit (0).

3. The method according to claim 2 wherein the address limit checking detects that the target address is outside a zone of memory, wherein the address limit boundary operand comprises a first address limit boundary operand for checking whether the target address is greater than the zone of memory and a second address limit boundary operand for checking whether the target address is less than the zone of memory.

4. The method according to claim 1 comprising the further step of:

when checking for the target address being less than the address limit operand, indicating a second address limit error when an arithmetic addition of a value of one "1", the sum bits, the first carry bits and the second carry bit produces a carry out value of zero "0" of the high order bit (0).

5. The method according to claim 1 comprising the further step of:

when checking for the target address being less than or equal to the address limit operand, indicating a second address limit error when an arithmetic addition of the sum bits, the first carry bits and the second carry bit produces a carry out value of zero "0" of the high order bit (0).

6. The method according to claim 1 wherein the address limit boundary operand comprises any one of (n+1) bits, (m+1) bits with bits ((n+1)–m) values assumed to be 0's or less than (n+1) bits.

7. The method according to claim 1 wherein any one of the base address operand or the offset operand comprises any one of (m+1) bits or less than (m+1) bits.

8. The method of according to claim 1 wherein the value of n comprises any one of 47, 33, or 32, representing limits of 64 KB, 1 GB, and 2 GB respectively.

9. A central processing unit performing address limit checking in a system having a target address, the target address comprising (m+1) significant bits formed by adding a binary representation of a base address operand to a binary representation of an offset address operand, wherein an address limit boundary is indicated by a binary representation of an address limit operand, a hardware circuit comprising:

adding in a first adder (for adding three binary fields), a high portion (bits 0–n) of the binary representation of the base address operand, a high portion (bits 0–n) of the binary representation of the offset address operand and a 1's complement of the binary representation (bits 0–n) of the address limit boundary operand to produce a first sum, the first adder comprising a full adder for each bit position (bits 0–n), the first sum comprising a sum bit for each bit position (bits 0–n) and a first carry bit for each bit position (bits 0–n); concurrently with the adding in the first adder step, adding in a second adder (for adding two binary fields), a binary representation of a low portion (bits (n+1)–(m)) of the base address operand and a binary representation of a low portion (bits (n+1)–(m)) of the offset address operand to produce a second carry bit, the second carry bit indicating a carry out of a high order bit (n+1) of the binary representation of the low portions (bits (n+1)–(m));

checking the target address against the address limit operand;

when checking for the target address being greater than the address limit operand, indicating a first address limit error when an arithmetic addition of the sum bits, the first carry bits and the second carry bit produces a carry out value of one "1" of the high order bit (0).

10. The hardware circuit according to claim 9 comprising the further step of:

when checking for the target address being greater than or equal to the address limit operand, indicating a first address limit error when an arithmetic addition of a value of one "1", the sum bits, the first carry bits and the second carry bit produces a carry out value of one "1" of the high order bit (0).

11. The hardware circuit according to claim 9 comprising the further step of:

when checking for the target address being less than the address limit operand, indicating a second address limit error when an arithmetic addition of a value of one "1", the sum bits, the first carry bits and the second carry bit produces a carry out value of zero "0" of the high order bit (0).

12. The hardware circuit according to claim 9 comprising the further step of:

when checking for the target address being less than or equal to the address limit operand, indicating a second address limit error when an arithmetic addition of the sum bits, the first carry bits and the second carry bit produces a carry out value of zero "0" of the high order bit (0).

13. A system performing address limit checking in a system having a target address, the target address comprising (m+1) significant bits formed by adding a binary representation of a base address operand to a binary representation of an offset address operand, wherein an address limit boundary is indicated by a binary representation of an address limit operand, the system comprising:

a central processor;

a main storage addressably coupled to the central processor;

a circuit for checking the target address for accessing the main storage, the circuit comprising:

a first adder (for adding three binary fields) adding, a high portion (bits 0–n) of the binary representation of the base address operand, a high portion (bits 0–n) of the binary representation of the offset address operand and a 1's complement of the binary representation (bits 0–n) of the address limit boundary operand to produce a first sum, the first adder comprising a full adder for each bit position (bits 0–n), the first sum comprising a sum bit for each bit position (bits 0–n) and a first carry bit for each bit position (bits 0–n)

a second adder (for adding two binary fields) adding concurrently with the adding in the first adder step, a binary representation of a low portion (bits (n+1)–(m)) of the base address operand and a binary representation of a low portion (bits (n+1)–(m)) of the offset address operand to produce a second carry bit, the second carry bit indicating a carry out of a high order bit (n+1) of the binary representation of the low portions (bits (n+1)–(m))

a checking circuit checking the target address against the address limit operand;

when checking for the target address being greater than the address limit operand, indicating a first address limit error when an arithmetic addition of the sum bits, the first carry bits and the second carry bit produces a carry out value of one "1" of the high order bit (0).

14. The circuit according to claim 13 further comprising:

when checking for the target address being greater than or equal to the address limit operand, indicating a first address limit error when an arithmetic addition of a value of one "1", the sum bits, the first carry bits and the second carry bit produces a carry out value of one "1" of the high order bit (0).

15. The circuit according to claim 13 further comprising:

when checking for the target address being less than the address limit operand, indicating a second address limit error when an arithmetic addition of a value of one "1", the sum bits, the first carry bits and the second carry bit produces a carry out value of zero "0" of the high order bit (0).

16. The circuit according to claim 13 further comprising:

when checking for the target address being less than or equal to the address limit operand, indicating a second address limit error when an arithmetic addition of the sum bits, the first carry bits and the second carry bit produces a carry out value of zero "0" of the high order bit (0).

* * * * *